(12) United States Patent
Chou et al.

(10) Patent No.: US 7,286,116 B2
(45) Date of Patent: Oct. 23, 2007

(54) KEYBOARD MODULE

(75) Inventors: Peter Chou, Taoyuan (TW);
Sheng-Ming Liu, Junghe (TW)

(73) Assignee: High Tech Computer Corp., Taoyuan (TW)

( * ) Notice: Subject to any disclaimer, the term of this patent is extended or adjusted under 35 U.S.C. 154(b) by 548 days.

(21) Appl. No.: 10/812,208

(22) Filed: Mar. 29, 2004

(65) Prior Publication Data
US 2005/0099394 A1 May 12, 2005

(30) Foreign Application Priority Data
Nov. 10, 2003 (TW) .............................. 92219905 U

(51) Int. Cl.
*G06F 3/02* (2006.01)
*G09G 5/00* (2006.01)
(52) U.S. Cl. ....................................... 345/168; 345/169
(58) Field of Classification Search ................ 345/156, 345/157, 168, 169; 341/20, 22; D14/333, D14/338, 346; 361/680
See application file for complete search history.

(56) References Cited

U.S. PATENT DOCUMENTS

| | | | |
|---|---|---|---|
| 4,974,183 A | 11/1990 | Miller | 364/703.12 |
| 5,584,588 A | 12/1996 | Harbaugh | 400/486 |
| D454,349 S | 3/2002 | Makidera et al. | |
| 6,657,560 B1 | 12/2003 | Jung | 341/22 |
| 6,925,315 B2 * | 8/2005 | Langford | 455/575.1 |
| 2003/0018397 A1 | 1/2003 | Chanu | 700/17 |
| 2003/0193480 A1 | 10/2003 | Nuovo et al. | 345/168 |
| 2006/0061556 A1 * | 3/2006 | Yamane | 345/173 |

FOREIGN PATENT DOCUMENTS

| | | |
|---|---|---|
| DE | 10045886 | 3/2002 |
| WO | WO03056784 | 7/2003 |
| WO | WO 03/087973 A2 | 10/2003 |

* cited by examiner

*Primary Examiner*—Ricardo Osorio
(74) *Attorney, Agent, or Firm*—Thomas, Kayden, Horstemeyer & Risley

(57) ABSTRACT

A keyboard module (300) includes a printed circuit board (302), a Qwerty keyboard (304) mounted on the printed circuit board. A plurality of application buttons (308) mounted on the printed circuit board and located within the Qwerty keyboard, and a navigator button (306) mounted on the printed circuit board and located also within the Qwerty keyboard. The navigator button has four direction buttons (316a, 316b, 316c, 316d) each having a profile higher than that of keys of the Qwerty keyboard. Each of four keys of the Qwerty keyboard neighboring the navigator button is located between two neighboring direction buttons of the navigator button.

20 Claims, 10 Drawing Sheets

KEYBOARD MODULE

This application claims the benefit of Taiwan application Serial No. 092219905, filed Nov. 10, 2003, the subject matter of which is incorporated herein by reference.

BACKGROUND OF THE PRESENT INVENTION

1. Field of the Present Invention

The present invention relates in general to an input apparatus, and more particularly to a keyboard module for a handheld electronic apparatus.

2. Description of the Related Art

High efficiency and convenience are what people are seeking mostly nowadays. Handheld electronic apparatus such as Personal Digital Assistant (PDA) and smart phone becomes essential item in briefcase for businessmen.

The handheld electronic apparatus enables users to access their personal address book and schedule for meetings and appointments. Moreover, with the aid of wireless connection network, users could quickly and freely access the network to obtain the latest news and other information.

In order to enable the user of the handheld electronic apparatus to easily manipulate the apparatus and write text messages, the handheld electronic apparatus is generally equipped with a keyboard module including a navigator button, four application buttons and a Qwerty keyboard.

FIG. 1 schematically illustrates a conventional keyboard module 100, which mainly includes a carrier device such as a printed circuit board 102, a Qwerty keyboard 104, a navigator button 106, and four application buttons 108. The keyboard 104 and the buttons 106, 108 are mounted on the printed circuit board 102. The Qwerty keyboard 104 is used for enabling the user to conveniently input a text message to the apparatus. The application buttons 108 are used for enabling the user to directly access specific application software of the apparatus, which usually is PIM (personal information management) software, like calendar, schedule, contact and e-mail. The navigator button 106 is used for enabling the user to quickly move a cursor on a display of the apparatus, or scroll vertically and horizontally a screen on the display of the apparatus.

The navigator button 106 is located between the application buttons 108, and the Qwerty keyboard 102 is located below the navigator button 106 and the application buttons 108.

Referring to FIGS. 2A and 2B, FIG. 2A is a perspective view of a conventional PDA and FIG. 2B is a top plain view of FIG. 2A. The conventional PDA 210 includes a housing 212. An LCD display 214 is mounted in an upper portion of the housing 212. A keyboard module (not labeled) is mounted in a lower portion of the housing 212. The keyboard module includes a navigator button 206 and four application buttons 208 just below the LCD display 214. A Qwerty keyboard 204 is located below the navigator button 206 and the application buttons 208. The navigator button 206 is located between the application buttons 208 so that two application buttons are located at a lateral side of the navigator button while the other two application buttons are located at an opposite lateral side of the navigator button 206.

In general, the Qwerty keyboard 204, navigator button 206 and application buttons 208 are mounted on a circuit board (not shown) in the housing 212. The buttons 206, 208 and keys of the keyboard 204 each have an upper portion protruding upwardly beyond the housing 212 so that the user can user his thumbs to depress the keys of the keyboard 204 and buttons 206, 208 to enter required function and information.

Easy usage and carriage are the basic principle and requirements of the design of the PDA 210. Designs with over-size and over-weight go against the principles of being light, thin, short and small. The conventional keyboard module of the PDA 210 mentioned above is actually big in size. Therefore, using the conventional keyboard module in the PDA 210 makes it difficult to reduce the size of the PDA 210, which results in the inconvenience in usage and carriage for the user.

SUMMARY OF THE PRESENT INVENTION

It is therefore an objective of the present invention to provide a keyboard module, used not only for reducing the size of the keyboard module efficiently, but also for providing with the smaller size, light and handy of the handheld electronic apparatus collocated with keyboard module.

In order to achieve the foregoing objectives, the present invention provides a keyboard module. The keyboard module includes a carrier device such as a printed circuit board, a Qwerty keyboard, a navigator button and four application buttons. The buttons and the keyboard are mounted on the carrier device. The navigator button is located within the Qwerty keyboard to thereby reduce the overall size of the keyboard module. The navigator button is configured having a cross-shaped configuration with four direction buttons at four extremities of the navigator button, respectively, and an action button at a center thereof. The Qwerty keyboard has four keys each being located between two neighboring direction buttons of the navigator button. Each of the direction buttons has a profile higher than that of the keys of the keyboard so that an operation of the navigator button does not interfere with the operation of the keys of the Qwerty keyboard. In a first embodiment, the direction buttons are integrally connected together and the application buttons are also located within the Qwerty keyboard. In a second embodiment, the direction buttons are integrally connected together and the application buttons are located outside and at a top of the Qwerty keyboard. In a third embodiment, the direction buttons are separated from each other, and the application buttons may be located within or outside the Qwerty keyboard.

The present invention further provides a handheld electronic apparatus includes a housing, a display mounted on an upper portion of the apparatus, and a keyboard module mounted on the housing below the display. The keyboard module is constructed in accordance with one of the three embodiments of the present invention as mentioned above.

Other objects, features, and advantages of the present invention will become apparent from the following detailed description of the preferred but non-limiting embodiments. The following description is made with reference to the accompanying drawings.

DETAILED DESCRIPTION OF THE PRESENT INVENTION

This invention is described by taking preferred embodiments as examples. However, the scope of the present invention is not limited to the examples. Herein, keyboard modules and handheld electronic apparatus are taken as examples to illustrate the spirit of the present invention. The scope of the present invention is defined by the appended claims.

Figure 3:
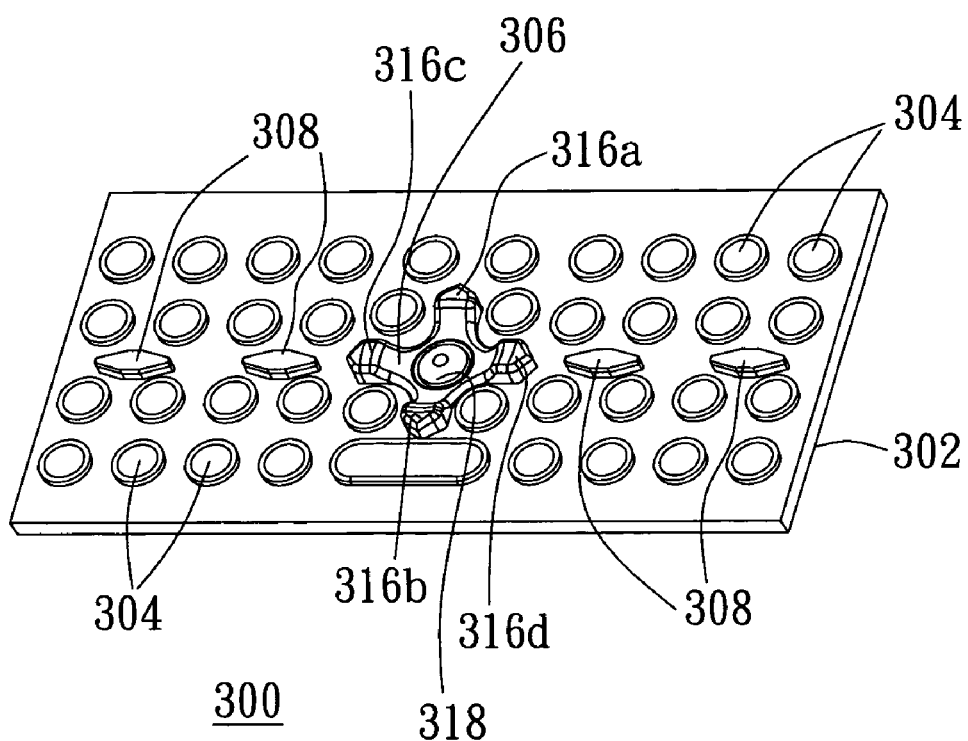
FIG. 3 is a perspective view of a keyboard module in accordance with a first preferred embodiment of the present invention.

Referring to FIG. 3, a perspective view of a keyboard module 300 in accordance a first embodiment of the present invention is illustrated. The keyboard module 300 mainly includes a carrier device which in this preferred embodiment is a printed circuit board 302, a keyboard 304 for text message writing, a navigator button 306 and four application buttons 308. The keyboard 304, the navigator button 306 and the four application buttons 308 are mounted on the printed circuit board 302. The keyboard 304 includes many keys and many intersection regions. Keys are arranged as an array, and intersection regions are located between keys. The keyboard 304 in this preferred embodiment of the present invention is a Qwerty keyboard. Other types of keyboard, which can be used to facilitate text message input is also within the scope of the present invention.

The navigator button 306 in accordance with the present invention has a cross-shaped configuration, and each of the application buttons 308 has an oblong configuration. The navigator button 306 and the application buttons 308 are all located within the Qwerty keyboard 304. The navigator button 306 includes four direction buttons 316a, 316b, 316c, 316d and an action button 318. The navigator button 306 is disposed at one of intersection regions of the keyboard 304. The direction buttons 316a, 316b, 316c, 316d are used for moving a cursor on a display of a handheld electronic apparatus to a desired position or scrolling a screen on the display upwardly/downwardly/leftwards/rightwards. The action button 318 when depressed activates a function of an icon pointed by the cursor. The direction buttons 316a, 316b, 316c, 316d are located at four extremities and the action button 318 is located at a center of the navigator button 306, while the navigator button 306 is located substantially at a center of the printed circuit board 302. Two application buttons 308 are located at a right side of the right direction button 316d while the other two application buttons 308 are located at a left side of the left direction button 316c. The application buttons 308 and the navigator button 306 divide the Qwerty keyboard 304 into an upper half and a lower half.

To prevent the user from erroneously depressing a key of the keyboard 304 neighboring the navigator button 306 when he (she) intends to depress one of the direction buttons 316a-316d, the direction buttons 316a-316d are configured to have a profile higher than that of the keys of the Qwerty keyboard 304, and four keys of the keyboard 304 near the navigator button 306 are so arranged that each of them is located between two neighboring direction buttons.

By the above-mentioned design of the keyboard module 300 in accordance with the present invention, users can easily press the direction buttons 316a, 316b, 316c, and 316d, and action button 318 of the navigator button 306 without the danger to mis-press the Qwerty keyboard 304.

Figure 4A:
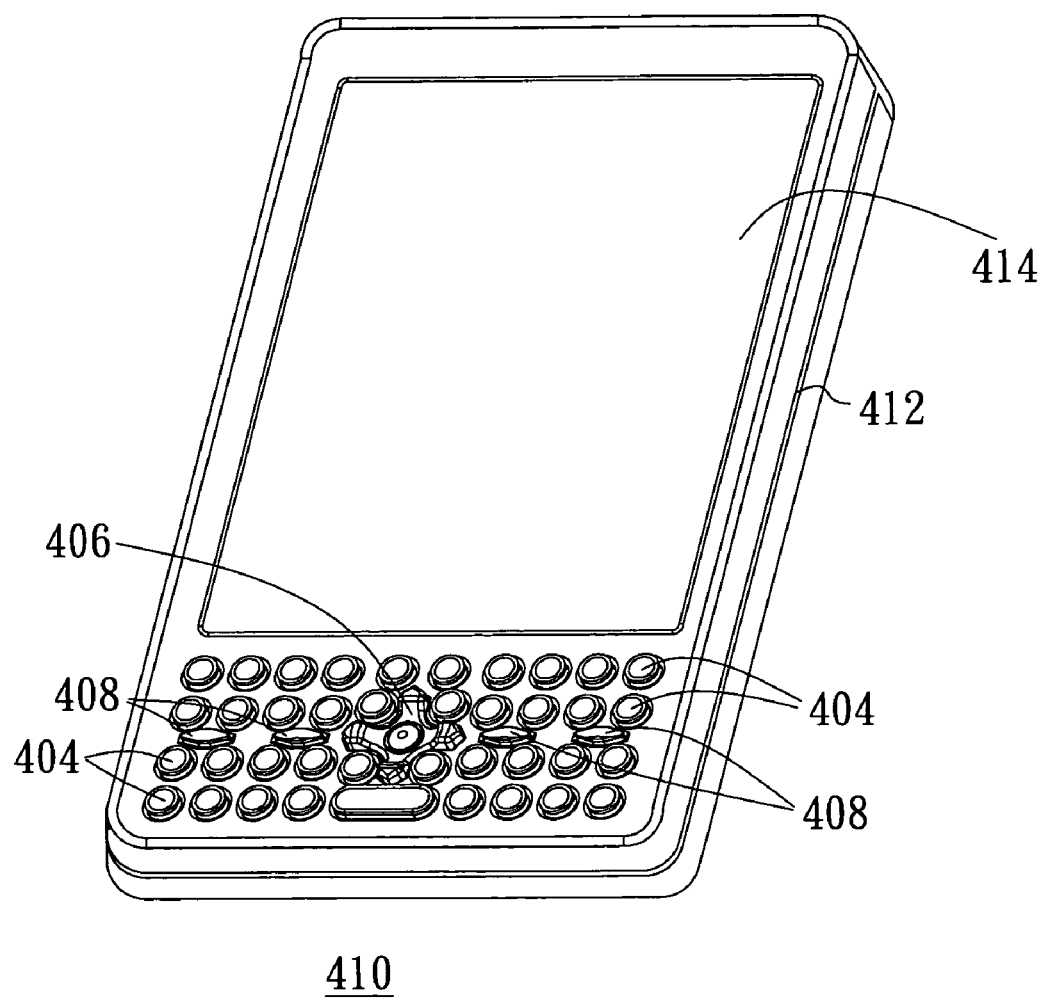
FIG. 4A is a perspective view of a handheld electronic apparatus incorporating a keyboard module similar to the first preferred embodiment of the present invention.
Figure 4B:
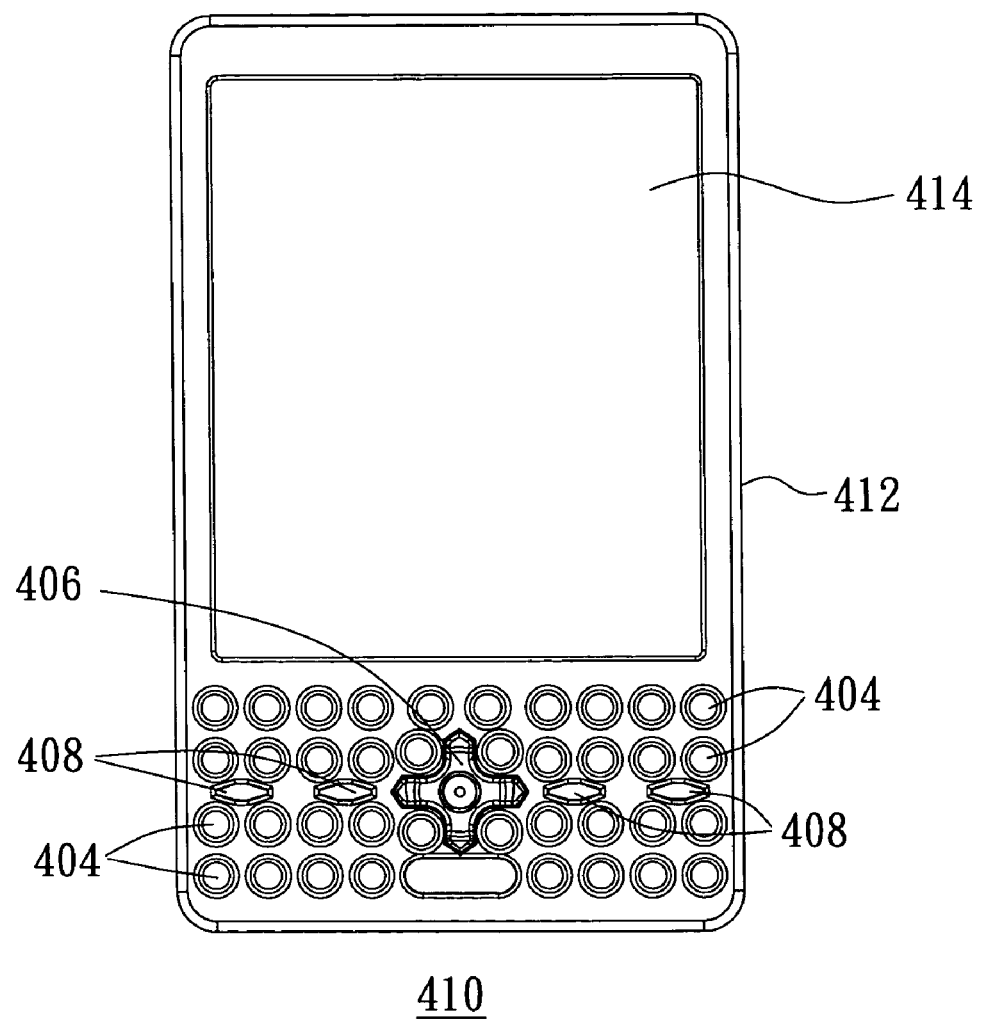
FIG. 4B is the top plain view of the handheld electronic apparatus of FIG. 4A.

Referring to FIGS. 4A and 4B, FIG. 4A is a perspective view of a handheld electronic apparatus 410 having a keyboard module similar to the keyboard module of FIG. 3 and FIG. 4B. is a top plain view of the handheld electronic apparatus of FIG. 4A.

The handheld electronic apparatus 410 in the shown example is a PDA. However, it is understood by those skilled in the art that the handheld electronic apparatus 410 is not limited to a PDA; it can be other handheld device, such as mobile phone, smart phone, notebook, tablet computer, or electronic dictionary console. The handheld electronic apparatus 410 includes a housing 412, an LCD display 414 mounted in an upper portion of the housing 412, and a keyboard module (not labeled) mounted in a lower portion of the housing 412 just below the display 414. The keyboard module has a printed circuit board (not shown) received in the housing 412, a Qwerty keyboard 404, four application buttons 408 and a navigator button 406. The keyboard 404 and the buttons 406, 408 are mounted on the printed circuit board, and protrude upward through an upper cover (not labeled) of the housing 412. The keyboard module in the handheld electronic apparatus has a structure the same as that of the keyboard module 300 of FIG. 3.

Figure 1:
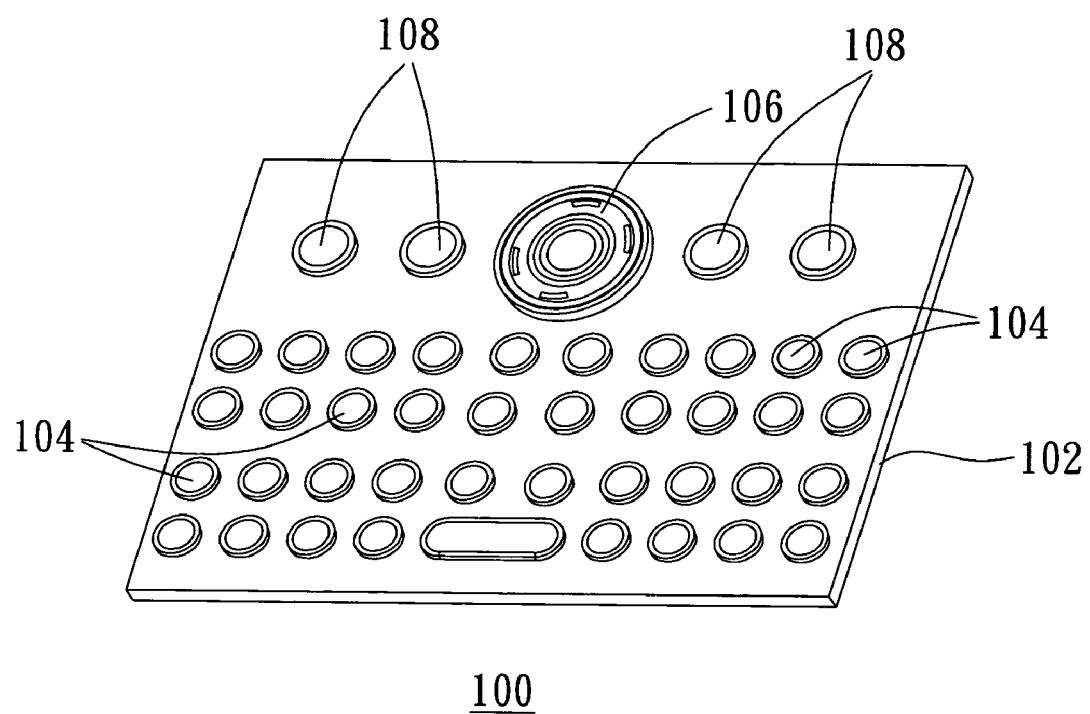
FIG. 1 illustrates a conventional keyboard module.
Figure 2A:
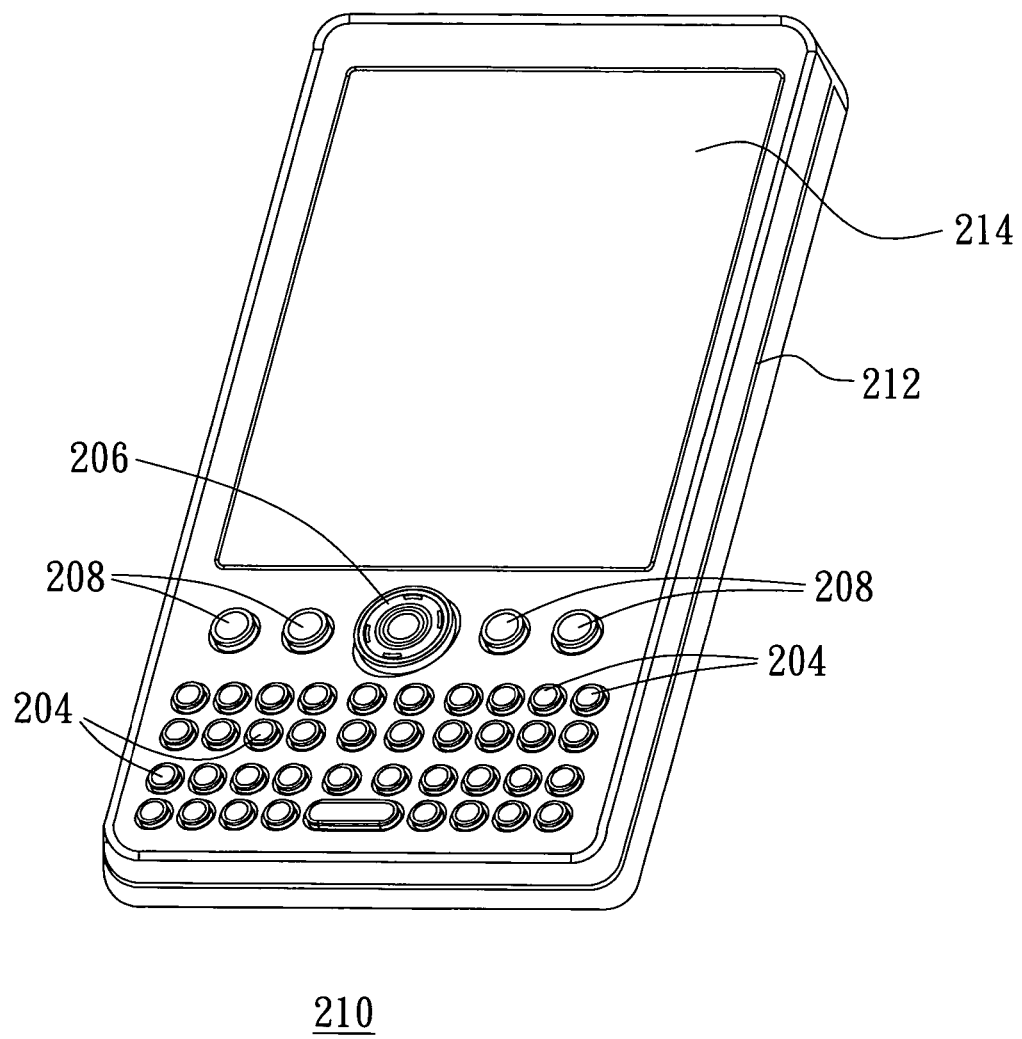
FIG. 2A is a perspective view of a conventional Personal Digital Assistant.
Figure 2B:
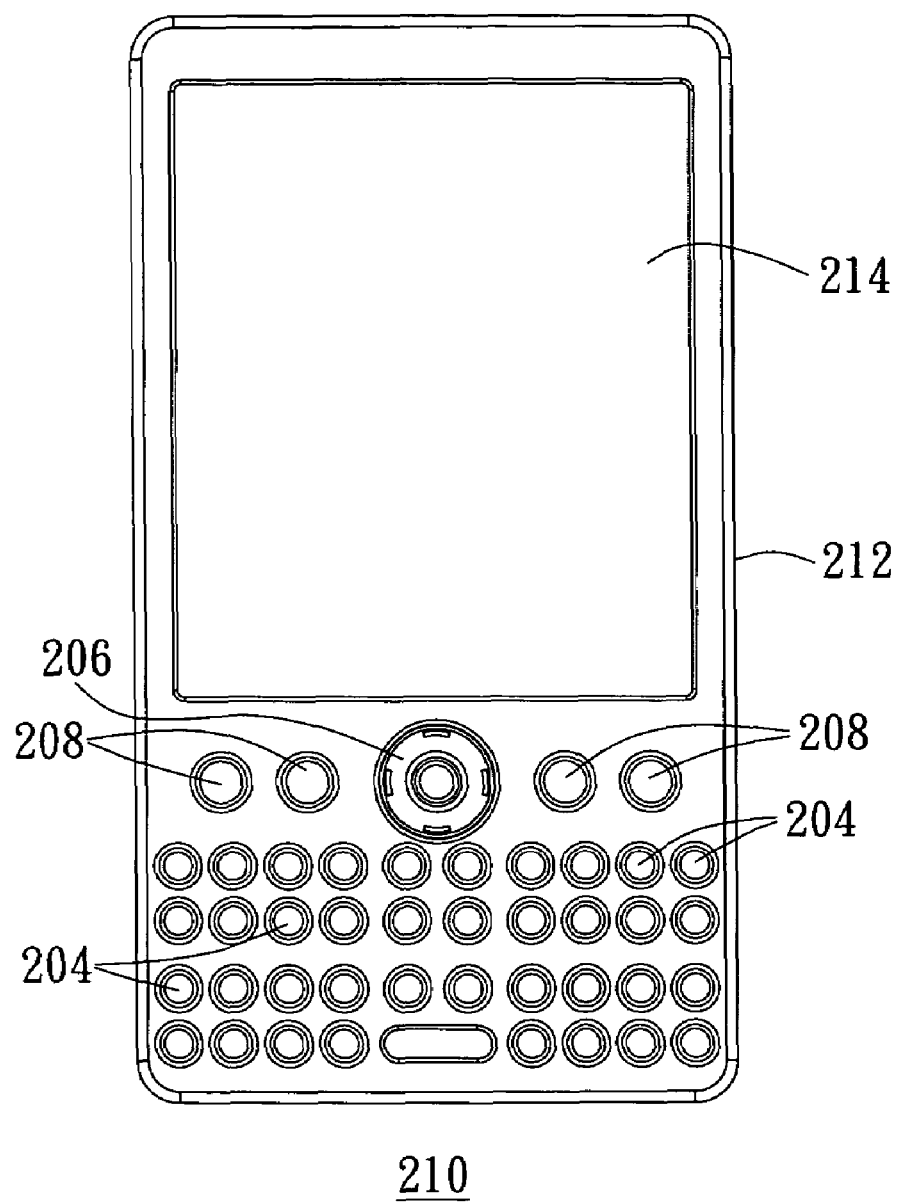
FIG. 2B is a top plain view of the Personal Digital Assistant of FIG. 2A.

The size of the above-mentioned keyboard module of the present invention is smaller than the conventional keyboard module of FIG. 1 because the navigator buttons 406 and application buttons 408 are now located within the keys of the Qwerty keyboard 404. Therefore, the overall size of the handheld electronic apparatus 410 can be reduced. Or if the overall size of the handheld electronic apparatus is not to be reduced, the size of the LCD display 414 can be enlarged. A large LCD display is more and more important for a handheld electronic apparatus.

Figure 5:
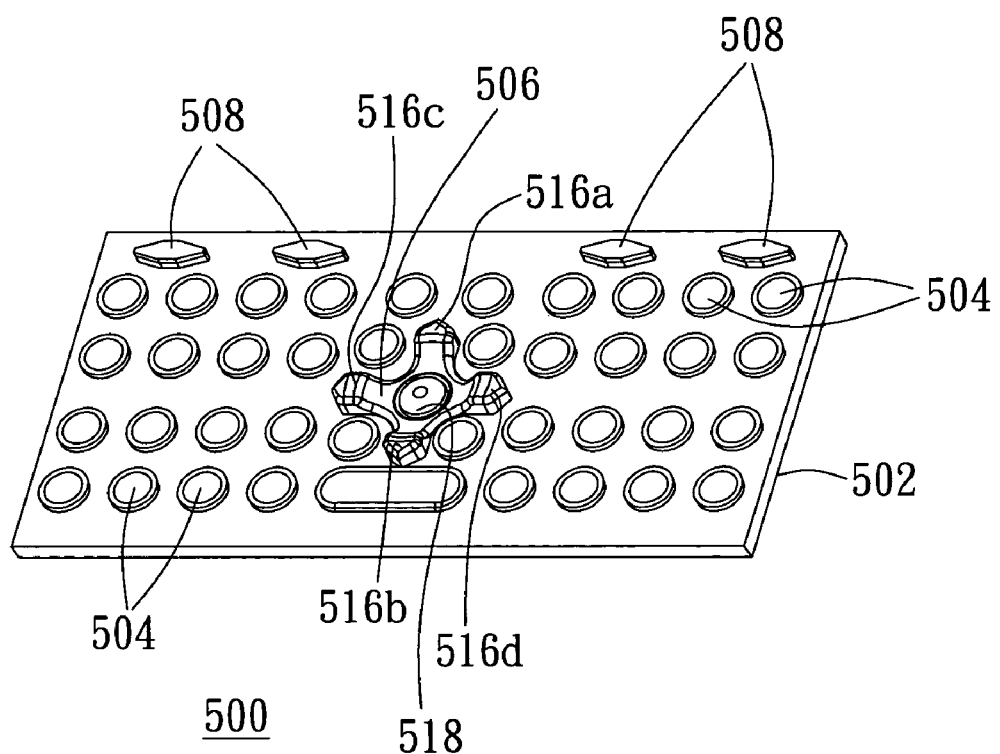
FIG. 5 is a perspective view of a keyboard module according to a second preferred embodiment of the present invention.

Referring to FIG. 5, a keyboard module 500 according to a second preferred embodiment of the present invention is illustrated. This keyboard module 500 mainly includes a printed circuit board 502, a Qwerty keyboard 504, a navigator button 506 and four application buttons 508. The keyboard 504 and the buttons 506, 508 are mounted on the printed circuit board 502.

The keyboard 504 and the navigator button 506 have configuration and are arranged in a manner similar to the first embodiment of FIG. 3. The navigator button 506, like the navigator button 306 of the first embodiment, has four direction buttons 516a, 516b, 516c, 516d at four extremities thereof, respectively, and an action button 518 at a center thereof.

In this embodiment, the application buttons 508 are located outside and at a top of the Qwerty board 504, rather than in the Qwerty board like the first embodiment.

Figure 6A:
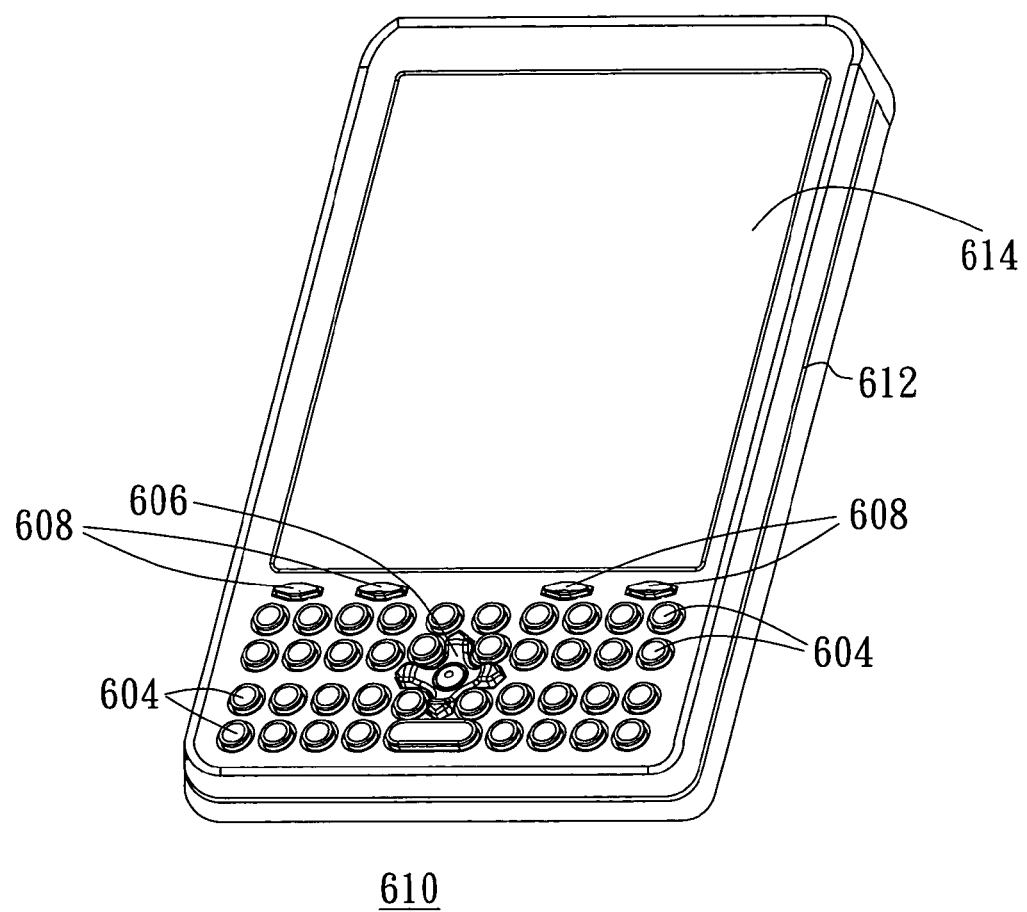
FIG. 6A is a perspective view of a handheld electronic apparatus incorporating the keyboard module similar to the second preferred embodiment of the present invention.
Figure 6B:
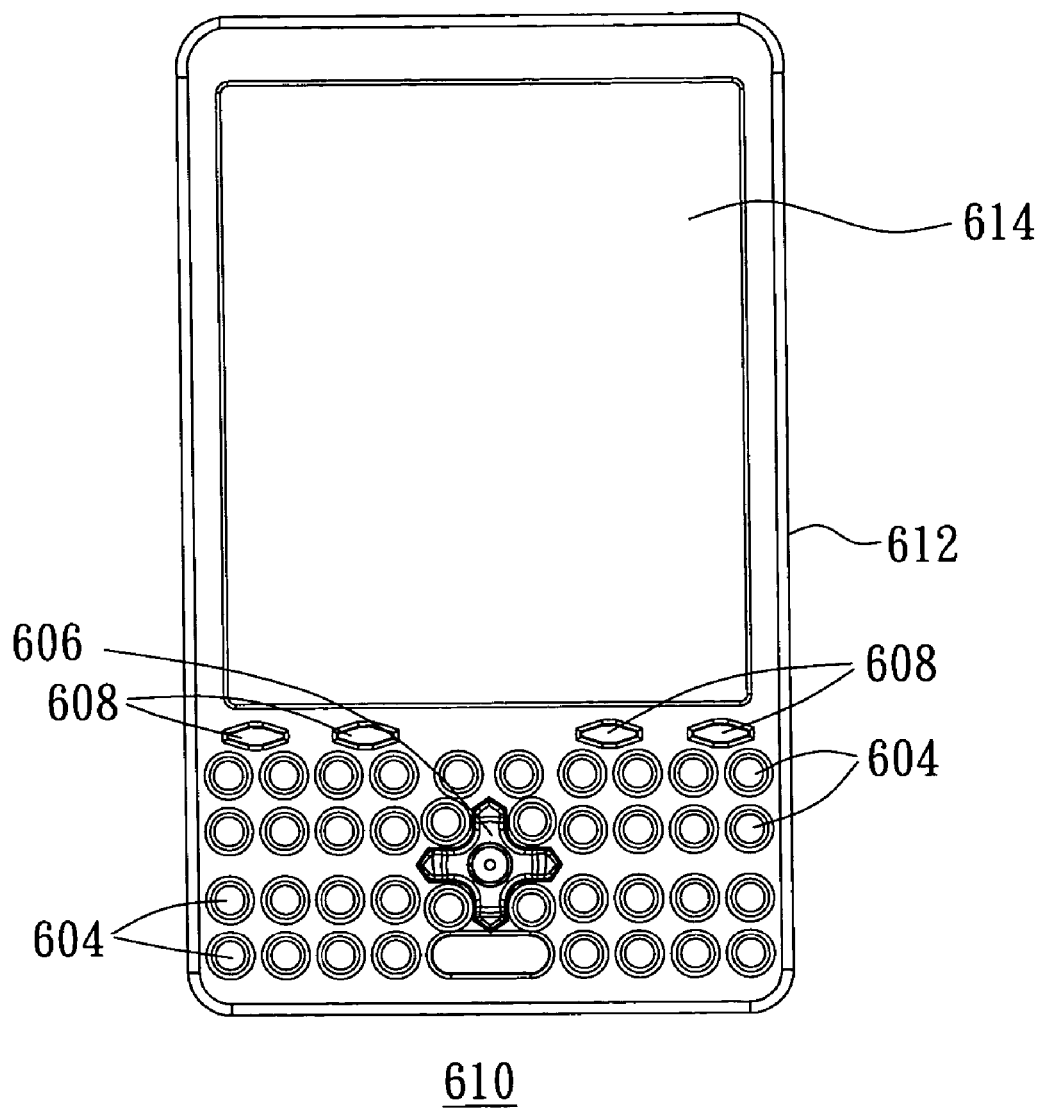
FIG. 6B is a top plain view of the handheld electronic apparatus of FIG. 6A.

Referring to FIGS. 6A and 6B, FIG. 6A shows a perspective view of a handheld electronic apparatus 610 incorporating a keyboard module similar to that of FIG. 5. FIG. 6B is a top plain view of FIG. 6A. The handheld electronic apparatus 610 has a housing 612, an LCD display 614, and a keyboard module (not labeled). The display 614 is mounted at an upper portion of the housing 612. The keyboard module is mounted at a lower portion of the housing 612. The keyboard module has a Qwerty keyboard 604, a navigator button 606 and four application buttons 608. The four application buttons 608 are located between the LCD display 614 and the Qwerty keyboard 604.

Figure 7:
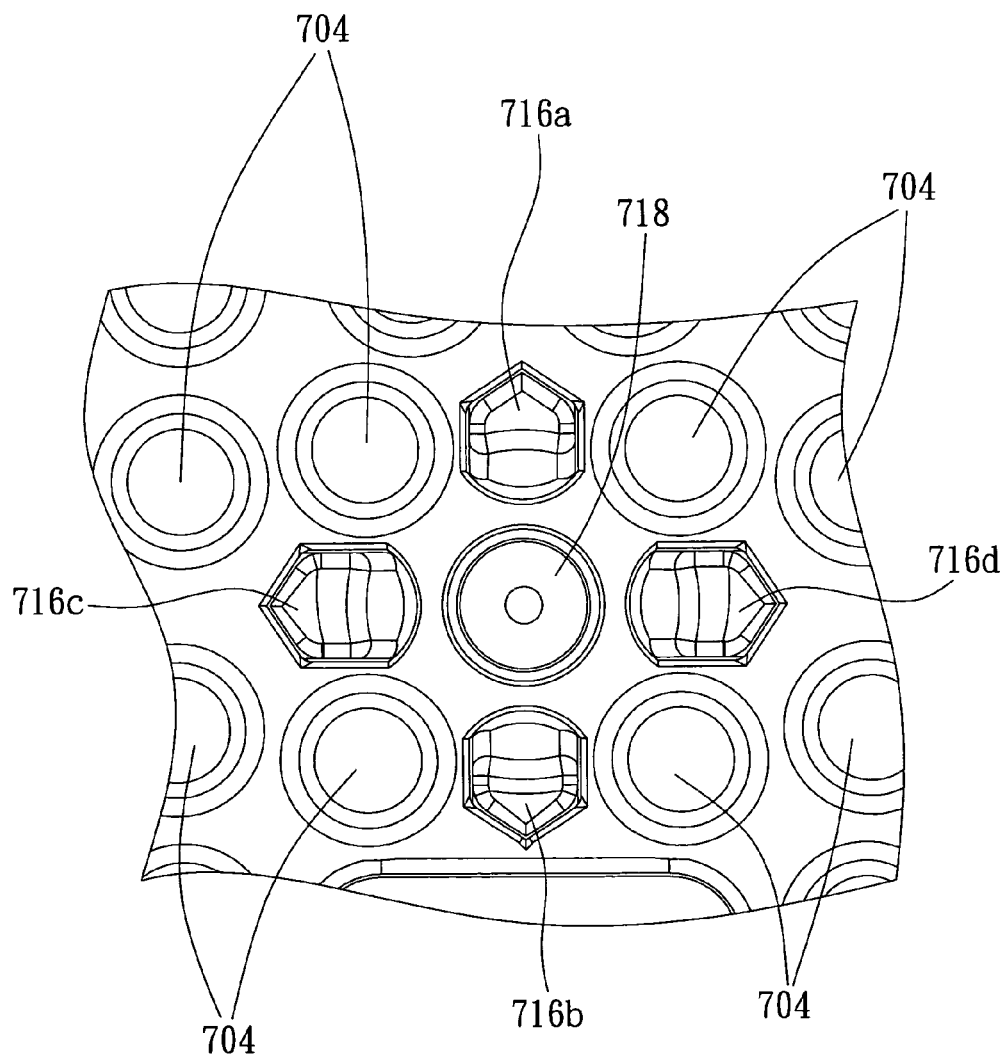
FIG. 7 is an enlarged fragmentary top plain view of a keyboard module according to a third embodiment of the present invention.

In the previous embodiments, the direction buttons 316a-d, 516a-d of the navigator buttons 306, 506 are formed as integrally connected together. However, the direction buttons can also be formed as separated from each other. As illustrating in FIG. 7, a keyboard module (not labeled) in accordance with a third embodiment of the present invention is shown. The keyboard module has a printed circuit board (not labeled), a Qwerty keyboard 704 and a navigator button (not labeled). The navigator button has four direction buttons 716a, 716b, 716c, and 716d and an action button 718 formed independently. The navigator button also has a cross-shaped configuration. The direction buttons 716a-716d are located at four extremities of the navigator button, while the action button 718 is located at a center thereof. The keyboard module may further include application buttons (not shown) arranged on the printed circuit board like that of the embodiment of FIG. 3 or FIG. 5.

While the present invention has been described by way of example and in terms of several preferred embodiments, it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A keyboard module comprising:
   a carrier device;
   a keyboard for entering text message, the keyboard being mounted on the carrier device and including a plurality of keys arranged as a rectangular array, and a plurality of intersection regions disposed therebetween; and
   a navigator button mounted on the carrier device and located within the keys of the keyboard, wherein the navigator button is disposed at one of the intersection regions, wherein the navigator button has a cross-shaped configuration with four direction buttons at four extremities of the navigator button, respectively, and the keys of the keyboard have four keys each being located between two neighboring direction buttons.

2. The keyboard module as claimed in claim 1, wherein at least one of the direction buttons has a profile higher than that of the keys of the keyboard.

3. The keyboard module as claimed in claim 1, wherein the navigator button further has an action button, and the action button being located at a center of the navigator button.

4. The keyboard module as claimed in claim 1, wherein the carrier device is a printed circuit board.

5. The keyboard module as claimed in claim 1, wherein the direction buttons are integrally connected together.

6. The keyboard module as claimed in claim 5 further comprising a plurality of application buttons located within the keys of the keyboard.

7. The keyboard module as claimed in claim 5 further comprising a plurality of application buttons located outside and at a top of the keys of the keyboard.

8. The keyboard module as claimed in claim 7, wherein the direction buttons have a profile higher than that of the keys of the keyboard.

9. The keyboard module as claimed in claim 1, wherein the direction buttons are separated from each other.

10. The keyboard module as claimed in claim 9 further comprising a plurality of application buttons located within the keys of the keyboard.

11. The keyboard module as claimed in claim 9 further comprising a plurality of application buttons located outside and at a top of the keys of the keyboard.

12. The keyboard module as claimed in claim 1, wherein the keyboard for entering text message is a Qwerty keyboard.

13. A handheld electronic device comprising:
    a housing;
    a display located at an upper portion of the housing and a keyboard module located at a lower portion of the housing, the keyboard module comprising a Qwerty keyboard and a navigator button located within the Qwerty keyboard, the Qwerty keyboard including a plurality of keys arranged as a matrix and a plurality of intersection regions disposed therebetween, wherein the navigator button has a cross-shaped configuration with four direction buttons at four extremities of the navigator button, respectively, and the keys of the keyboard have four keys each being located between two neighboring direction buttons.

14. The handheld electronic apparatus as claimed in claim 13 further comprising application buttons located within the Qwerty keyboard.

15. The handheld electronic apparatus as claimed in claim 13, wherein the direction buttons are integrally connected together.

16. The handheld electronic apparatus as claimed in claim 13, wherein the direction buttons are separated from each other.

17. The handheld electronic apparatus as claimed in claim 13 further comprising application buttons located between the Qwerty keyboard and the display.

18. The handheld electronic apparatus as claimed in claim 13, wherein the direction buttons are integrally connected together.

19. The handheld electronic apparatus as claimed in claim 13, wherein the direction buttons are separated from each other.

20. The handheld electronic apparatus as claimed in claim 13, wherein the navigator button has a profile higher than that of keys the Qwerty keyboard.

* * * * *